US008846157B2

(12) United States Patent
Bonin

(10) Patent No.: US 8,846,157 B2
(45) Date of Patent: Sep. 30, 2014

(54) PRODUCTION OF SOLID MATERIALS BASED ON HYDRAULICALLY SETTING COATING AGENTS

(75) Inventor: Klaus Bonin, Burghausen (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 12/600,337

(22) PCT Filed: May 15, 2008

(86) PCT No.: PCT/EP2008/055960
§ 371 (c)(1),
(2), (4) Date: Nov. 16, 2009

(87) PCT Pub. No.: WO2008/145532
PCT Pub. Date: Dec. 4, 2008

(65) Prior Publication Data
US 2010/0159147 A1 Jun. 24, 2010

(30) Foreign Application Priority Data
May 30, 2007 (DE) .................. 10 2007 024 964

(51) Int. Cl.
C04B 28/02 (2006.01)
C04B 111/62 (2006.01)
C04B 111/00 (2006.01)
(52) U.S. Cl.
CPC .............. C04B 28/02 (2013.01); *C04B 2111/62* (2013.01); *C04B 2111/00672* (2013.01); *C04B 2111/00517* (2013.01); *C04B 2111/00146* (2013.01)
USPC ........... 427/427; 427/403; 106/694; 106/730; 106/805
(58) Field of Classification Search
USPC ................. 427/403, 427; 106/694, 730, 805
See application file for complete search history.

(56) References Cited

U.S. PATENT DOCUMENTS

| 4,088,804 | A | * | 5/1978 | Cornwell et al. | ............ 428/220 |
| 4,308,189 | A | * | 12/1981 | Moritani et al. | ............ 524/459 |
| 4,393,939 | A | * | 7/1983 | Smith et al. | .................. 166/293 |
| 4,895,598 | A | * | 1/1990 | Hedberg et al. | ............... 106/694 |
| 4,960,465 | A | * | 10/1990 | Arfaei | ........................... 106/724 |
| 5,580,166 | A | * | 12/1996 | Schmittchen et al. | ......... 366/11 |
| 2004/0060481 | A1 | * | 4/2004 | Schlenoff | ..................... 106/802 |
| 2005/0234191 | A1 | * | 10/2005 | Ingrisch et al. | ............. 525/54.2 |
| 2009/0030168 | A1 |   | 1/2009 | Schorm et al. | |

FOREIGN PATENT DOCUMENTS

| DE | 102006007282 | | 8/2007 | |
| EP | 0812812 | | 12/1997 | |
| EP | 1777476 | A1 * | 4/2007 | ............ C04B 35/117 |
| WO | WO 00/05283 | | 2/2000 | |
| WO | WO 02/066393 | | 8/2002 | |
| WO | WO 2007/093551 | | 8/2007 | |

OTHER PUBLICATIONS

Flick, Ernest W. "Water-Soluble Resins" An Industrial Guide, Second Edition; Book; 1991; Noyes Publications, Park Ridge, NJ, USA.
Fox, T. G.; #J5—"Influence of Diluent and of Copolymer Composition on the Glass Temperature of a Polymer System"; Bulletin American Physics Society; vol. 1; 1956; p. 123 (1 p).
Lee, W. A. & Rutherford, R. A.; "The Glass Transition Temperatures of Polymers"; Polymer Handbook, $2^{nd}$ Edition; 1975; 53 pp.; J. Wiley & Sons, New York.
Pollio, Marco; "International Search Report"; Nov. 14, 2008; 2 pp; European Patent Office, Rijswik, The Netherlands.

* cited by examiner

*Primary Examiner* — Timothy Meeks
*Assistant Examiner* — Nathan T Leong
(74) *Attorney, Agent, or Firm* — RatnerPrestia

(57) ABSTRACT

The invention relates to a method for producing solid materials having an air content of ≤16 vol. % in relation to the total volume of solid materials, characterised in that hydraulically setting coating agents containing at least one cationic protective colloid are applied to an undersurface by means of mechanical methods using compressed air with air quantity factors of up to 100 or by manual methods.

11 Claims, No Drawings

PRODUCTION OF SOLID MATERIALS BASED ON HYDRAULICALLY SETTING COATING AGENTS

CROSS REFERENCE TO RELATED APPLICATIONS

This is a U.S. National Phase application of PCT application number PCT/EP2008/055960, filed May 15, 2008 which claims priority benefit of DE 10 2007 024 964.2, filed May 30, 2007, each of which is incorporated herein by reference in its entirety.

FIELD OF THE INVENTION

The present invention relates to a method for producing solid materials based on hydraulically setting coating agents and the solid materials obtainable thereby.

BACKGROUND OF THE INVENTION

For the production of solid materials based on hydraulically setting coating agents such as for example concrete or mortar, mechanical methods and also manual methods are common. However, the properties of the solid materials depend considerably on the nature and manner of their production.

In the manual method, the hydraulically setting coating agents are for example applied onto the substrate with a trowel. In mechanical methods, the hydraulically setting coating agents are supplied in a feed line of a spray nozzle with which the hydraulically setting coating agents are applied onto the substrate in question. Mechanical methods such as for example the dry or wet spray methods are described in DIN 18551. In the dry spray method, hydraulically setting coating agents are used in the form of dry mixtures and made up with water in the spray nozzle. In the wet spray method, aqueous hydraulically setting coating agents are used. In the wet spray method, as in the dry spray method, further additives such as for example setting accelerators can be added to the hydraulically setting coating agents in the spray nozzle. After setting of the hydraulically setting coating agents, the solid materials are obtained.

The strength of the solid materials depends for example on the air content or the density of the solid materials and correlates with the statistical distribution of the air pore diameters (air pore distribution). When the spray method is used, the strength of the solid materials can be increased by forcing the aqueous coating agents through the spray nozzle with compressed air, so that the hydraulically setting coating agents are accelerated to high speeds and finally on impact against the substrate undergo a strong rebound. As a result of the rebound, some of the air escapes from the hydraulically setting coating agents and the hydraulically setting coating agents are compacted. In addition, the air pore distribution in the hydraulically setting coating agent also changes. Overall, the impact leads to an increase in the strength of the hydraulically setting coating agents. The acceleration of hydraulically setting coating agents with compressed air can be quantified using the air consumption factor:

Air consumption factor=(compressed air volume/t)/(concrete volume/t)

In the formula for the air consumption factor, the variable t stands for a time value. The air consumption factor is a dimensionless quantity and with mechanical methods normally assumes values of 144 to 240.

The hydraulically setting coating agents applied with compressed air and said air consumption factors result in solid materials which have an air content lower by ca. 5% and hence a correspondingly higher density compared to solid materials produced by the manual method. In addition, the use of compressed air has a very strong influence on the air pore distribution in the hydraulically setting coating agents and in the corresponding solid materials. Thus in solid materials which were made by the manual method usually over 40% of the air pores have a diameter in the range from 500 to 50000 nm. In contrast, in solid materials which were made by the spray method with the aforesaid air consumption factors, usually considerably fewer than 35% of the air pores have a diameter of 500 to 50000 nm.

However, the use of compressed air with the aforesaid air consumption factors in the spray method also has the effect that as a result of the impact against the substrate the hydraulically setting coating agents fall off the substrate again (rebound) to a considerable extent and must be removed from the building side and disposed of as useless waste. The rebound usually amounts to more than 20 percent of the coating. A further disadvantage is the high equipment and energy cost which is associated with the use of compressed air for such high air consumption factors.

The manual method does offer the advantage that hardly any rebound occurs and the equipment costs are low. However, as already discussed above, compared to the mechanical method with the use of compressed air with the aforesaid air consumption factors the manual method has the disadvantage that, owing to the low impact, only solid materials which have a lower density, a higher air content, a different air pore distribution and hence lower strength are obtainable with the manual method.

SUMMARY OF THE INVENTION

Against this background, the problem was to provide manual methods and mechanical methods for the production of solid materials based on hydraulically setting coating agents with which only slight rebound should occur and by means of which at the same time solid materials corresponding in their properties to the solid materials obtainable by mechanical methods with the use of air consumption factors of 144 to 240 should be obtainable.

Surprisingly, the problem was essentially solved by the use of hydraulically setting coating agents which contain one or more cationic protective colloids. With the hydraulically setting coating agents according to aspects of the invention, by the mechanical method with air consumption factors from 10 to 100 or the manual method, solid materials are obtained with properties such as were previously only obtainable with the use of mechanical methods and air consumption factors of 144 to 240. Owing to the low air consumption factors with the use of the mechanical method according to aspects of the invention, the hydraulically setting coating agents only undergo slight impact against the substrate, so that also only a very slight rebound occurs.

DETAILED DESCRIPTION OF THE INVENTION

A subject of the Invention is a method for the production of solid materials with an air content of ≤16.0 volume %, based on the total volume of the solid materials, characterized in that hydraulically setting coating agents containing one or more cationic protective colloids are applied onto a substrate by mechanical methods using compressed air with air consumption factors from 10 to 100 or by manual methods.

In the mechanical method, air consumption factors of preferably from 10 to 50, particularly preferably from 10 to 25 and most preferably from 12 to 20 are selected. The distance of the spray nozzle from the coating surface is preferably from 1.50 m to 0.50 m, particularly preferably from 0.80 to 1.20 m. The coating thickness of the hydraulically setting coating agent is usually 5 to 40 cm. For the mechanical method, spray machines or spray robots can for example be used.

The manual method is for example effected by rough-casting the hydraulically setting coating agent onto a substrate with a trowel, as for example described in DIN V 18550.

Suitable cationic protective colloids are polymers with a cationic charge. Such polymers are for example described in E. W. Flick, Water-Soluble Resins—an Industrial Guide, Noyes Publications, Park Ridge, N.J., 1991. Polymers which contain cationic monomer units, particularly preferably monomer units with quaternary ammonium groups, sulfonium groups and phosphonium groups, are preferably used. Homo- or mixed polymers of one or more cationic monomers from the group comprising diallyldimethylammonium chloride (DADMAC), diallyl-diethylammonium chloride (DADEAC), (3-methacryloxy)-propyltrimethylammonium chloride (MPTAC), (3-methacryloxy)ethyltrimethylammonium chloride (METAC), (3-methacrylamido)propyltrimethylammonium chloride (MAPTAC), 2-dimethylaminoethyl methacrylate or 3-dimethylamino-propylmethacrylamide (DMAEMA or DMAPMA protonated species at pH≤5) are most preferable.

In general, the cationic protective colloids contain 20 to 100 wt. %, preferably 50 to 100 wt. %, particularly preferably 100 wt. %, of cationic monomer units, based on the total weight of the cationic protective colloid. Suitable nonionic, copolymerizable monomers are vinyl esters with 1 to 15 C atoms in the carboxylic acid residue, such as vinyl acetate, vinyl propionate and vinyl dodecanoate, acrylamide, hydroxyethyl (meth)-acrylate, hydroxypropyl (meth)acrylate, esters of methacrylic acid and acrylic acid with alcohols with 4 to 13 C atoms, polyalkylene glycol (meth)acrylates with C2 to C4 alkylene units and molecular weights from 350 to 2000 g/mol, and N-vinylpyrrolidone, N-vinylcapro-lactam, acryloxypropyltrialkoxy- and methacryloxy-propyltrialkoxysilanes, vinyltrialkoxysilanes and vinylmethyldialkoxysilanes and/or mixtures of said nonionic comonomers.

Cationic protective colloids with a K value (determined on the basis of DIN 53726, 1 wt. % in water, 25° C., Ubbelohde viscosimeter) from 10 to 250, particularly preferably 25 to 130, are preferably used. The change in DIN 53726, the standard for the determination of the viscosity of PVC in the Ubbelohde viscosimeter, is that water is used as the solvent instead of cyclohexanone. The Höppler viscosity of the cationic protective colloids is 1 to 50 mPas, preferably 1 to 25 mPas, most preferably 1 to 15 mPas (in each case determined by the method of Höppler at 20° C. according to DIN 53015).

The production of cationic protective colloids is for example known from DE-A 102006007282 and can for example be effected by free radical polymerization in aqueous solution, in solvent mixtures or in the presence of salts, for example also in precipitation polymerization, for example by polymer analog reaction in solution or solvent mixtures, for example in suspension or for example by inverse emulsion polymerization.

Preferably, the hydraulically setting coating agents contain one or more polymers based on ethylenically unsaturated monomers (base polymers) and optionally nonionic protective colloids and/or nonionic emulsifiers.

Monomers suitable for the production of the base polymer are vinyl esters of linear or branched alkyl-carboxylic acids with 1 to 15 C atoms, methacrylate esters and acrylate esters with alcohols with 1 to 15 C atoms, vinylaromatics, olefins, dienes or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids with 9 to 13 C atoms, for example VeoVa9® or VeoVa10® (Shell brand names). Vinyl acetate is particularly preferred. Preferred methacrylate esters or acrylate esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Particularly preferred are methyl acrylate, methyl methacrylate, n-butyl acrylate and 2-ethylhexyl acrylate. Examples of olefins and dienes are ethylene, propylene and 1,3-butadiene. Suitable vinylaromatics are styrene and vinyltoluene. A suitable vinyl halide is vinyl chloride.

Examples of homo- and mixed polymers suitable as the base polymer are vinyl acetate homopolymers, mixed polymers of vinyl acetate with ethylene, mixed polymers of vinyl acetate with ethylene and one or more other vinyl esters, mixed polymers of vinyl acetate with ethylene and acrylate esters, mixed polymers of vinyl acetate with ethylene and vinyl chloride, styrene-acrylate ester copolymers and styrene-1,3-butadiene copolymers.

Vinyl acetate homopolymers, mixed polymers of vinyl acetate with 1 to 40 wt. % of ethylene, mixed polymers of vinyl acetate with 1 to 40 wt. % of ethylene and 1 to 50 wt. % of one or more other comonomers from the group of vinyl esters with 1 to 15 C atoms in the carboxylic acid residue such as vinyl propionate or vinyl dodecanoate, vinyl esters of alpha-branched carboxylic acids with 9 to 13 C atoms such as VeoVa9®, Veova10® or VeoVa11®, mixed polymers of vinyl acetate, 1 to 40 wt. % of ethylene and preferably 1 to 60 wt. % of acrylate esters of linear or branched alcohols with 1 to 15 C atoms, in particular n-butyl acrylate or 2-ethylhexyl acrylate, and mixed polymers with 30 to 75 wt. % of vinyl acetate, 1 to 30 wt. % of vinyl laurate or vinyl esters of an alpha-branched carboxylic acid with 9 to 13 C atoms, and 1 to 30 wt. % of acrylate esters of linear or branched alcohols with 1 to 15 C atoms, in particular n-butyl acrylate or 2-ethylhexyl acrylate, which also contain 1 to 40 wt. % of ethylene, and mixed polymers with vinyl acetate, 1 to 40 wt. % of ethylene and 1 to 60 wt. % of vinyl chloride, where the polymers can further contain said auxiliary monomers in said quantities and the quantities stated in wt. % in each case add up to 100 wt. %, are preferred.

(Meth)acrylate ester polymers, such as mixed polymers of n-butyl acrylate or 2-ethylhexyl acrylate or copolymers of methyl methacrylate with n-butyl acrylate and/or 2-ethylhexyl acrylate and optionally ethylene, styrene-(meth)acrylate ester copolymers with one or more monomers from the group methyl acrylate, ethyl acrylate, propyl acrylate, n-butyl acrylate and 2-ethylhexylacrylate, vinyl acetate-(meth)acrylate ester copolymers with one or more monomers from the group methyl acrylate, ethyl acrylate, propyl acrylate, n-butyl acrylate, 2-ethylhexylacrylate and optionally ethylene, and styrene-1,3-butadiene copolymers, where the polymers can further contain said auxiliary monomers in said quantities and the quantities stated in wt. % in each case add up to 100 wt. %, are also preferred.

The selection of the monomer or the selection of the proportions by weight of the comonomers is effected such that in general a glass transition temperature Tg from −50° C. to +50° C., preferably −30° C. to +10° C., results. The glass transition temperature Tg of the polymers can be determined in a known manner by differential scanning calorimetry (DSC). The Tg can also be evaluated approximately using the Fox equation. According to Fox T. G., Bull. Am. Physics Soc. 1, 3, page 123 (1956): $1/Tg=x1/Tg1+x2/Tg+ \ldots +xn/Tgn$, where xn stands for the mass fraction (wt. %/100) of the monomer n, and Tgn for the glass transition temperature in degrees Kelvin of the homopolymer of the monomer n. Tg values for homopolymers are listed in Polymer Handbook 2nd Edition, J. Wiley & Sons, New York (1975).

The base polymer is produced in an aqueous medium and preferably by the emulsion polymerization method—as described for example in DE-A 102006007282. In this, the base polymers are produced in the form of aqueous dispersions and can be converted by common drying methods into corresponding powders redispersible in water.

Mixtures of cationic protective colloids and base polymers are preferably used. Such mixtures are described below as cationically stabilized polymers. Methods for the production of cationically stabilized polymers are for example known from DE-A 102006007282. Cationically stabilized polymers in the form of aqueous dispersions are for example obtained by performing the polymerization for the production of base polymers in the presence of cationic protective colloids. Cationically stabilized polymers in the form of aqueous dispersions can also be produced by mixing aqueous dispersions of base polymers with cationic protective colloids. Here the cationic protective colloids can be used in solid or liquid form or as an aqueous solution, aqueous emulsion or aqueous dispersion. Cationically stabilized polymers in the form of aqueous dispersions are also obtainable by redispersing in water cationically stabilized polymers in the form of powders redispersible in water.

Cationically stabilized polymers in the form of powders redispersible in water are for example obtained by drying aqueous dispersions of the base polymer, it being possible to add the cationic protective colloids before, during or after the drying. Here, the cationic protective colloids can also be used in combination with nonionic protective colloids or in combination with nonionic emulsifiers. Suitable nonionic protective colloids are for example polyvinyl alcohols, polyvinyl acetals, polyvinylpyrrolidones, polysaccharides in aqueous form such as starches (amylose and amylopectin), celluloses and methyl, hydroxyethyl or hydroxypropyl derivatives thereof and poly(meth)-acrylamide. Suitable nonionic emulsifiers are for example surfactants such as alkyl polyglycol ethers or alkylaryl polyglycol ethers with 8 to 40 alkylene oxide units.

The cationically stabilized polymer contains the cationic protective colloid, optionally in combination with a nonionic protective colloid and/or nonionic emulsifier, in a proportion from 0.1 to 20 wt. % overall, preferably from 1 to 12 wt. %, each based on the polymeric components of the cationically stabilized polymers. Cationically stabilized polymers in the form of aqueous dispersions have a solids content preferably from 10 to 75 wt. %, particularly preferably from 40 to 60 wt. %.

Typical formulae for hydraulically setting coating agents contain 15 to 30 wt. % cement, in particular Portland, aluminous, pozzolanic, slag, magnesia, phosphate or blast furnace cement. A further component is 50 to 90 wt. % of fillers such as silica sand, gravel, carbonate fillers such as calcium carbonate, talc, light fillers, hollow beads, pozzolanic reacting fillers such as fly ash, metakaolin, microsilica and rubber clippings. In addition, 0.00005 to 1.25 wt. %, preferably 0.0005 to 0.75 wt. % of cationic protective colloids are used. Optionally, 0.1 to 10.0 wt. %, preferably 0.2 to 3.0 wt. % and particularly preferably 0.5 to 1.5 wt. % of base polymers in the form of powders redispersible in water or in the form of aqueous dispersions with a solids content preferably from 10 to 75 wt. %, particularly preferably from 40 to 60 wt. %, are used. The quantities in wt. % here each relate to 100 wt. % dry mass of the formula. For the production of the polymer-modified hydraulically setting coating agents, 40 to 60 wt. % of water, based on the total quantity of the cement used, is preferably used.

The performance properties of the hydraulically setting coating agents can be improved by addition of additives. In preferred embodiments of the hydraulically setting coating agents, additives contained are for example 0.1 to 8 wt. % of setting accelerators, such as for example aluminum salts, aluminates, alkali metal silicates, alkali metal carbonates or alkali metal hydroxides. In addition, pigments, foam stabilizers, waterproofing agents, plasticizers, fly ash, dispersed silica, superplasticizers, air pore agents for controlling the concrete crude density or pumping aids for improving the pumping properties can be added.

The production of the hydraulically setting coating agents is not associated with any specific procedure or mixing device and can for example be effected in a concrete mixer or a ready-mix plant. The hydraulically setting coating agents can be delivered to the building site ready mixed. Dry mixtures, which are only converted to hydraulically setting coating agents by addition of water at the building site, can also be produced from the components of the formula.

Examples of hydraulically setting coating agents are concrete, mortar, such as for example jointing mortar, tile adhesive, self-levelling materials, screeding, putty or fillers.

A further subject of the invention are solid materials with an air content of ≤16.0 volume %, based on the total volume of the solid materials, obtainable by application of hydraulically setting coating agents onto a substrate, characterized in that the hydraulically setting coating agents contain one or more cationic protective colloids and are applied onto a substrate by mechanical methods using compressed air with air consumption factors from 10 to 100 or by manual methods.

The solid materials have an air content of preferably less than 15.5%, particularly preferably from 5 to 15%, quite especially preferably from 7 to 14% and most preferably from 10 to 13.5%, the quantities in % in each case being based on the total volume of the solid materials.

The solid materials contain air pores with an air pore diameter from 500 to 50000 nm in a proportion of preferably ≤35%, particularly preferably ≤25% and most preferably ≤15%, each based on the total number of air pores present in the solid materials.

Also preferred are solid materials in which the proportion of air pores with an air pore diameter of
≤500 nm is preferably ≥60%, particularly preferably
≥70% and most preferably is ≥80%, each based on the total number of air pores present in the solid materials.

Also preferred are solid materials in which a maximum of 35% of the air pores have a diameter from 500 to 50000 nm and at least 60% of the air pores have a diameter of ≤500 nm.

With the use of the manual method, the solid materials preferably have densities from 2050 to 2300 kg/cm3, particularly preferably from 2070 to 2200 kg/cm3, quite especially preferably from 2080 to 2150 kg/cm3 and most preferably from 2090 to 2150 kg/m3. With the use of the mechanical method, the solid materials preferably have densities from 2130 to 2400 kg/m3, particularly preferably from 2150 to 2400 kg/m3, quite especially preferably from 2160 to 2300 kg/m3 and most preferably from 2170 to 2300 kg/m3.

As a result of their low air content, their air pore distribution and their high density, the solid materials according to aspects of the invention have high compressive strength.

The following examples serve for the detailed illustration of the invention and should in no way be understood as a restriction.

EXAMPLES

Production of the Solid Materials

Example 1 (Ex. 1): Manual Method

All components of the formula stated in Example 2 were placed in a 100 l concrete mixer (Zyklos Z 75 synchronous forced flow mixer) and uniformly mixed by stirring for 2 minutes. The mixture was allowed to stand for 8 minutes, then stirred again for 1 min and treated with melamine sulfonate-formaldehyde condensation product during this. The hydraulically setting coating agent thus obtained was placed in a formwork (length/height/width=70 cm/40 cm/70 cm) by hand using a trowel in accordance with DIN 196. After storage for 28 days at 23° C. and 50% atmospheric humidity, the solid material was removed from the formwork and subjected to performance testing.

Example 2 (Ex. 2): Mechanical Method

Firstly, water, sand, gravel and Portland cement CEM I 42.5 in the quantities stated in the formula were placed in a 100 l concrete mixer (Zyklos Z 75 synchronous forced flow mixer) and uniformly mixed by stirring for 2 minutes. The mixture was allowed to stand for 8 minutes, then stirred again for 1 min and treated with the amount indicated of melamine sulfonate-formaldehyde condensation product during this, as a result of which the wet concrete mixture was obtained.

In addition, the aqueous dispersion of the cationically stabilized polymer was placed in an Ultratorax stirrer under normal conditions according to DIN50014 and treated with the aqueous dispersion of aluminum sulfate with stirring. After stirring for a further 5.0 mins, the additive was obtained.

Using the wet spray process, the additive was mixed into the wet concrete mixture in the spray nozzle (Mayco wet spray nozzle NW 50). The hydraulically setting coating material was poured into a formwork (length/height/width=70 cm/40 cm/70 cm) using compressed air with an air consumption factor of 18.4 and a flow rate of 108 m3/h. The distance of the spray nozzle from the substrate was 80 cm. After storage for 28 days at 23° C. and 50% atmospheric humidity, the solid material was removed from the formwork and subjected to performance testing.

Formula for the Hydraulically Setting Coating Agent:
962 kg sand (up to 4.0 mm particle diameter)
643 kg gravel (4.0 to 8.0 mm particle diameter)
450 kg Portland cement CEM I 42.5
0.23 kg melamine sulfonate-formaldehyde condensation product (superplasticizer) (Sika Addiment FM/F, Sika brand name)
136 kg water
45 kg aqueous dispersion of aluminum sulfate (SC=50%)
45 kg aqueous dispersion of the cationically stabilized polymer (SC=50%) consisting of an aqueous dispersion of a vinyl acetate-ethylene copolymer with a Tg of −5° C., which based on the vinyl acetate-ethylene copolymer contains 10 wt. % of polytrimethylammonium-propyl-methacrylamide chloride.

Comparative Example 1 (CEx. 1)

In contrast to Example 1, the wet concrete mixture was made up with 156 kg of water and no aqueous dispersion of the cationic polymer was added.

Comparative Example 2 (CEx. 2)

In contrast to Example 1, the wet concrete mixture was made up with 146 kg of water and instead of the aqueous dispersion of the cationic polymer 45 kg of an aqueous dispersion of a polyvinyl alcohol-stabilized vinyl acetate-ethylene copolymer with a solids content of 50 wt. % and a Tg of −7° C. was used.

Comparative Example 3 (CEx. 3)

In contrast to Example 2, the wet concrete mixture was made up with 156 kg of water and no aqueous dispersion of the cationic polymer was added. During the use of the wet spray method, compressed air with a flow rate of 1080 m3/h and with an air consumption factor of 175 was used.

Comparative Example 4 (CEx. 4)

In contrast to Example 2, the wet concrete mixture was made up with 146 kg of water and instead of the aqueous dispersion of the cationic polymer 45 kg of an aqueous dispersion of a polyvinyl alcohol-stabilized vinyl acetate-ethylene copolymer with a solids content of 50 wt. % and a Tg of −7° C. was used. During the use of the wet spray method, compressed air with a flow rate of 1080 m3/h and with an air consumption factor of 180 was used.

Comparative Example 5 (CEx. 5)

In contrast to Example 2, during the use of the wet spray method, compressed air with a flow rate of 1080 m3/h and with an air consumption factor of 186 was used.

Comparative Example 6 (CEx. 6)

In contrast to Example 2, the wet concrete mixture was made up with 156 kg of water and no aqueous dispersion of the cationic polymer was added.

Comparative Example 7 (CEx. 7)

In contrast to Example 2, the wet concrete mixture was made up with 146 kg of water and instead of the aqueous dispersion of the cationic polymer 45 kg of an aqueous dispersion of a polyvinyl alcohol-stabilized vinyl acetate-ethylene copolymer with a solids content of 50 wt. % and a Tg of −7° C. was used.

TABLE 1

Overview of method parameters in the examples and comparative examples:

| | Method | Compressed air [m3/hr] | Air consumption factor |
|---|---|---|---|
| Ex. 1 | manual | — | 0 |
| CEx. 1 | manual | — | 0 |
| CEx. 2 | manual | — | 0 |
| CEx. 3 | mechanical | 1080 | 175 |
| CEx. 4 | mechanical | 1080 | 180 |
| CEx. 5 | mechanical | 1080 | 186 |

TABLE 1-continued

Overview of method parameters in the examples and comparative examples:

| | Method | Compressed air [m3/hr] | Air consumption factor |
|---|---|---|---|
| CEx. 6 | mechanical | 108 | 17.7 |
| CEx. 7 | mechanical | 108 | 17.9 |
| Ex. 2 | mechanical | 108 | 18.4 |

Determination of the Air Content of the Solid Materials:

The air content of the solid materials of the examples and comparative examples was determined according to DIN 66133. The results are summarized in table 2.

Determination of the Density of the Solid Materials:

The densities of the solid materials obtained according to the examples and the comparative examples was determined according to DIN EN 196. The results are summarized in table 2.

Determination of the Compressive Strength of the Solid Materials:

Cylindrical drilling cores with a base area of 2000 mm$^2$ and a height of 100 mm were taken from the solid materials obtained and their compressive strength was tested according to DIN EN 196. The results are summarized in table 2.

Determination of the Rebound:

The hydraulically setting coating agents described in example 2 and comparative examples 3, 4 and 5 were applied onto a vertical substrate consisting of concrete by the wet spray method using the respective values set out in table 1 for the flow rates and air consumption factors. The distance of the spray nozzle from the substrate was 80 cm. The quantity of hydraulically setting coating agent that had fallen away from the substrate in each case was weighed and divided by the respective mass of hydraulically setting coating agent sprayed onto the substrate. The results are stated in table 2.

It is clear from table 2 that with the use of the method according to aspects of the invention almost no rebound occurs (table 2, example 2). In contrast, with the use of compressed air with high values for the air consumption factors, rebound which must be disposed of as waste occurs to a considerable extent (table 2, comparative examples 3 to 5).

TABLE 2

| | Air content [%] | Density [kg/m3] | Compressive strength [N/mm2] | Rebound [%] |
|---|---|---|---|---|
| Ex. 1 | 13.1 | 2104 | 41.6 | — |
| CEx. 1 | 16.7 | 1942 | 26.5 | — |
| CEx. 2 | 17.9 | 2030 | 38.0 | — |
| CEx. 3 | 12.2 | 2177 | 49.0 | 18.1 |
| CEx. 4 | 11.1 | 2223 | 54.3 | 14.5 |
| CEx. 5 | 12.0 | 2181 | 55.6 | 15.3 |
| CEx. 6 | 16.1 | 2042 | 32.6 | 2.6 |
| CEx. 7 | 17.4 | 2115 | 43.2 | 1.6 |
| Ex. 2 | 12.5 | 2175 | 49.3 | 1.5 |

It is clear from table 2 that with the use of the mechanical method according to aspects of the invention solid materials are obtained with an air content, density and compressive strength (table 2, example 2) such as were previously only obtainable with the application of coating agents not according to aspects of the invention with the use of compressed air with high air consumption factors (table 2, comparative examples 3 to 5). A comparison of the air content, density and compressive strength of example 2 with the corresponding values of comparative examples 6 and 7 clearly shows that with coating agents not according to aspects of the invention with the use of the mechanical method with low air consumption factors no solid materials with high compressive strength, high density and low air content are obtainable. Even with the manual method according to aspects of the invention (table 2, example 1), a solid material with a considerably higher compressive strength and higher density and lower air content is obtained than with the use of coating compositions not according to aspects of the invention by the manual method (table 2, comparative examples 1 and 2).

Determination of the Air Pore Distribution of the Solid Materials:

The air pore distribution of the solid materials was determined by mercury intrusion porosimetry according to DIN 66133. The results are summarized in table 3.

TABLE 3

Air pore distribution:

| | Air pore content G [%] in relation to air pore diameter d [nm]: | | |
|---|---|---|---|
| | G (d < 500) | G (500 ≤ d ≤ 50000) | G (d > 50000) |
| Ex. 1 | 80.3 | 13.9 | 5.8 |
| CEx. 1 | 53.5 | 39.2 | 7.3 |
| CEx. 2 | 46.8 | 46.2 | 7.0 |
| CEx. 3 | 88.9 | 5.8 | 5.3 |
| CEx. 4 | 86.0 | 8.5 | 5.5 |
| CEx. 5 | 81.6 | 10.9 | 7.5 |
| Ex. 2 | 83.3 | 9.8 | 6.9 |

It is clear from table 3 that independently of the application method the air pore distributions of the solid materials according to aspects of the invention are always similar. Thus the application of hydraulically setting coating agents by hand (example 1) or mechanically with the use of a high air consumption factor (comparative example 5) or a low air consumption factor (example 2) always leads to parallel distributions. The solid materials according to aspects of the invention have air pore distributions (examples 1 and 2) such as were previously only obtainable with the application of coating agents not according to aspects of the invention with the use of high air consumption factors (comparative examples 3 and 4). In contrast, on application of hydraulically setting coating agents not according to aspects of the invention by the manual method, i.e. in a method in which the air consumption factor assumes a value of zero, solid materials which have too great a proportion of air pores in the range from 500 to 50000 nm (comparative examples 1 and 2) are obtained.

The invention claimed is:

1. A method for the production of solid materials with an air content of ≤16.0 volume %, based on the total volume of the solid materials, comprising applying to a substrate a hydraulically setting coating agent containing cationically stabilized polymers comprising one or more polymeric protective colloids, which contain cationic charges, and one or more polymers based on vinyl acetate, vinyl propionate, vinyl butyrate, vinyl 2-ethylhexanoate, vinyl laurate, 1-methylvinyl acetate, vinyl pivalate, vinyl esters of alpha-branched monocarboxylic acids with 9 to 13 C atoms, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate, ethylene, propylene, 1, 3-butadiene, styrene, vinyl toluene or vinyl chloride; wherein the one or more polymers are stabilized with a stabilizer consisting of one or more cationic protective colloids and optionally nonionic protective colloids and/or nonionic emulsifiers; said applying comprising spray methods using compressed air with an air consumption factor from 10 to 100.

2. The method of claim 1, wherein the hydraulically setting coating agent additionally contains one or more polymers based on one or more ethylenically unsaturated monomers selected from the group consisting of vinyl esters of linear or branched alkylcarboxylic acids with 1 to 15 C atoms, methacrylate esters and acrylate esters with alcohols with 1 to 15 C atoms, vinylaromatics, olefins, dienes and vinyl halides.

3. The method of claim 1, wherein the hydraulically setting coating agent is concrete, mortar, tile adhesive, a self-levelling material, screeding, putty or a filler.

4. The method of claim 1, wherein the hydraulically setting coating further comprises from 50 to 90 wt. % of one or more fillers selected from silica, sand and gravel.

5. The method of claim 1, wherein the polymeric protective colloids are based on 20 to 100 wt. % of cationic monomer units, based on the total weight of the polymeric protective colloids, and optionally nonionic, copolymerizable monomers selected from vinyl esters with 1 to 15 C atoms in the carboxylic acid residue, acrylamide, hydroxyethyl (meth)acrylate, hydroxypropyl (meth)acrylate, esters of methacrylic acid and acrylic acid with alcohols with 4 to 13 C atoms, polyalkylene glycol (meth)acrylates with C2 to C4 alkylene units and molecular weights from 350 to 2000 g/mol, N-vinylpyrrolidone, N-vinylcaprolactam, acryloxypropyltrialkoxy- and methacryloxy-propyltrialkoxysilanes, vinyltrialkoxysilanes and vinylmethyldialkoxysilanes.

6. The method of claim 1, wherein the hydraulically setting coating further comprises from 50 to 90 wt. % of one or more fillers selected from sand and gravel.

7. The method of claim 1, wherein the polymeric protective colloids are based on 50 to 100 wt. % of cationic monomer units, based on the total weight of the polymeric protective colloids, and optionally nonionic, copolymerizable monomers selected from vinyl esters with 1 to 15 C atoms in the carboxylic acid residue, acrylamide, hydroxyethyl (meth)acrylate, hydroxypropyl (meth)acrylate, esters of methperylic acid and acrylic acid with alcohols with 4 to 13 C atoms, polyalkylene glycol (meth)acrylates with C2 to C4 alkylene units and molecular weights from 350 to 2000 g/mol, N-vinylpyrrolidone, N-vinylcaprolactam, acryloxypropyltrialkoxy- and methacryloxy-propyltrialkoxysilanes, vinyltrialkoxysilanes and vinylmethyldialkoxysilanes.

8. The method of claim 1, wherein the polymeric protective colloids are based on 100 wt. % of cationic monomer units, based on the total weight of the polymeric protective colloids, and optionally nonionic, copolymerizable monomers selected from vinyl esters with 1 to 15 C atoms in the carboxylic acid residue, acrylamide, hydroxyethyl (meth)acrylate, hydroxypropyl (meth)acrylate, esters of methacrylic acid and acrylic acid with alcohols with 4 to 13 C atoms, polyalkylene glycol (meth)acrylates with C2 to C4 alkylene units and molecular weights from 350 to 2000 g/mol, N-vinylpyrrolidone, N-vinylcaprolactam, acryloxypropyltrialkoxy- and methacryloxy-propyltrialkoxysilanes, vinyltrialkoxysilanes and vinylmethyldialkoxysilanes.

9. The method of claim 1, wherein the one or more polymeric protective colloids are based on 100 wt. % of one or more cationic monomer units selected from the group consisting of diallyldimethylammonium chloride, diallyldiethylammonium chloride, (3-methacryloxy)propyltrimethylammonium chloride, (3-methacryloxy)ethyltrimethylammonium chloride, (3-methacrylamido)propyltrimethylammonium chloride, 2-dimethylaminoethyl methacrylate and 3-dimethylaminopropylmethacrylamide.

10. The method of claim 1, wherein the hydraulically setting coating agent contains in a range from 15 to 30 wt % of cement, based on the total dry mass of the coating agent.

11. The method of claim 1, wherein the hydraulically setting coating agent contains in a range from 0.00005 to 1.25 wt % of the polymeric protective colloid, based on the total dry mass of the coating agent.

* * * * *